United States Patent [19]

Hill

[11] Patent Number: 5,307,203
[45] Date of Patent: Apr. 26, 1994

[54] CONFOCAL TANDEM SCANNING REFLECTED LIGHT MICROSCOPE

[75] Inventor: James D. Hill, Mt. Airy, Md.

[73] Assignee: Tandem Scanning Corporation, Reston, Va.

[21] Appl. No.: 623,102

[22] Filed: Dec. 6, 1990

[51] Int. Cl.[5] ........................ G02B 21/00; G02B 26/02
[52] U.S. Cl. ................................. 359/368; 359/235; 359/236
[58] Field of Search ............... 359/368, 234, 235, 236, 359/385, 389, 384

[56] References Cited

U.S. PATENT DOCUMENTS

| | | | |
|---|---|---|---|
| 3,517,980 | 12/1967 | Petran et al. | 35/527 |
| 4,365,871 | 12/1982 | Muchel | 359/656 |
| 4,597,634 | 7/1986 | Steenblik | 359/615 |
| 4,802,748 | 2/1989 | McCarthy et al. | 359/368 |
| 4,927,254 | 5/1990 | Kino et al. | 359/368 |

OTHER PUBLICATIONS

Petran et al "Tandem Scanning Reflected Light Microscope", *Science of Biological Specimen preparation*, pp. 85-94, SEM, Inc., AMF O'Hare.

"The Tandem Scanning Reflected Light Microscope", *Scanning*, vol. 7, pp. 97-108 (1985), Petran et al.

*Primary Examiner*—Loha Ben
*Assistant Examiner*—James Phan
*Attorney, Agent, or Firm*—Thomas P. Liniak

[57] ABSTRACT

An improved method and apparatus for easily and accurately aligning confocal tandem scanning reflected light microscopes having scanning disc hole diameters as small as 20 microns are described. The method involves the observation and analysis of Moire and other patterns of light occurring within the microscope, and using the apparatus to make very sensitive adjustments that result in a fully aligned, rugged, and stable confocal tandem scanning reflected light microscope offering improved resolution, contrast, and optical slicing capability.

12 Claims, 11 Drawing Sheets

← Top of Microscope

Top of Microscope

Front of Microscope

Top of Microscope

Front of Microscope

CONFOCAL TANDEM SCANNING REFLECTED LIGHT MICROSCOPE

TECHNICAL FIELD

This invention relates to an improved confocal tandem scanning reflected light microscope. More specifically, the present invention relates to a rugged, stable, easily adjustable apparatus for mounting the major optical components, and a new method for aligning confocal tandem scanning reflected light microscopes.

BACKGROUND ART

In U.S. Pat. No. 3,517,980 of Jun. 30, 1970, Petran and Hadravsky described a confocal tandem scanning reflected light microscope wherein light is passed to a target through a rotating disc containing several thousand very small holes. Such light is then reflected from the target in a pattern of pinpoints of light through holes in the scanning disc that are exactly opposite the illumination holes. Such a microscope improves resolving power and permits observation of objects covered by translucent materials. The embodiments produced and available to date have used scanning discs having hole diameters of about 60 microns, which holes are larger than is desirable for best microscope resolution, contrast discrimination, and thinnest optical slicing capability. The major reason for not producing microscopes with smaller disc holes is the inability to align such microscopes precisely and easily, and to maintain such alignment, using component mounting schemes and adjustment techniques currently embodied.

This present invention relates to confocal tandem scanning reflected light microscopes having scanning disc holes of diameter as small as 20 microns, and more particularly to an improved optical element mounting apparatus, and to an improved method of adjusting such apparatus. Confocal tandem scanning microscopes having very small scanning disc holes are particularly important and useful for real time, high-magnification viewing of, among other things, living bulk translucent tissues (as in the living eye) and the thinnest possible optical slices thereof, with best resolution and contrast discrimination, all a direct result of the presence of smaller scanning disc holes and precise optical path alignment methods.

In current confocal tandem scanning microscopes using 60 micron holes, alignment of optical elements in the light path is critical, difficult and time consuming, and may not be precise enough to obtain best microscope performance, even for the 60 micron holes. In devices currently on the market, the various elements to be adjusted are basically stacked (piggybacked) so that certain adjustments along the stack are inter-related with other adjustments of elements in the stack. The alignment process involves placing external red and green light sources at the illumination area and viewing area of the disc respectively, and attempting to move the interacting components so as to achieve exact registration of all the red and green pinpoints of light, when viewed through the objective lens opening (both the illumination and the viewing areas can be seen superimposed due to the presence of a beamsplitter). If adjustments can be made so that all the red holes can be exactly superimposed on the all the green holes, the microscope is correctly aligned. Such a method is very laborious and somewhat imprecise when the holes are 60 microns in diameter, and is prohibitively laborious and very imprecise when the holes are 20 or 30 microns in diameter, and therefore is not practical for use when the smaller holes are employed.

One other type of confocal tandem scanning microscope that is currently available (called a "one-path" or "one-sided" confocal tandem scanning microscope) uses disc holes in the 20 to 40 micron range, and requires no special alignment, since it projects the illumination and receives it back through the same scanning hole. Such a microscope is less complex and generally less expensive than a full "two-path" microscope as in the original invention, but has the disadvantage of requiring that the beamsplitter be placed in apposition to the opposite surface of the disc, so that the illuminating light passes through the beamsplitter before passing through the disk, thus exposing the eyepiece to a substantially larger amount of stray reflections than in the two- path microscope. A one-path embodiment is most effective where the light (signal) reflected from the target is bright relative to the light from undesired sources (noise), including stray internal reflections. Such a microscope is readily usable in observing integrated circuit "chips" and other high-reflectance or high contrast targets; however, it is less effective where the light reflected from the target is well below ambient light, such as when the target is one of many types of soft biological tissue (e.g., living eyes) or other relatively non-reflective or low contrast materials.

SUMMARY AND BRIEF DESCRIPTION OF THE INVENTION

It is an object of the present invention to provide a full two-path confocal tandem scanning microscope having scanning disc holes (disc holes may be through-holes or may be apertures etched in deposited materials, as in chrome deposited on clear glass) in the 20-30 micron diameter range, thereby attaining enhanced capability to optically slice, resolve, and discriminate in living, bulk, soft translucent tissue or similar material in real time.

It is a further object of the present invention to describe rugged and stable apparatuses on which are mounted such microscope optical components, incorporating a method of non-interactive component arrangement having all necessary (6) degrees of freedom so that accurate alignment of the microscope can be achieved, with all individual adjustments being easily, quickly, and precisely accomplished with a minimum of interactions.

It is a further object of the present invention that the adjustment processes use only the observation and analysis of information available from reflected light patterns within the microscope, thereby eliminating the requirement for registration of externally supplied lights, and the hole-size limitations associated therewith.

It is a further objective of the present invention to describe a step-by-step adjusting procedure for achieving best alignment in the confocal tandem scanning reflected light microscope.

According to the present invention, a tandem scanning reflected light microscope employs a base member (mainframe) on which is mounted substantially all of the adjustment members and to which all adjustment members are referenced. In the normal use of the microscope, the objective lens and the target constitute a cat's-eye retro-reflector. Light from a point on an illumination area as defined by a hole in a scanning disc is focused by the objective to a point on the target. (See for instance applicant's co-pending application Ser. No. 07/497,318, filed Mar. 22, 1990 now U.S. Pat. No. 5,083,220 issued Jan. 21, 1992, and assigned to the same assignee as the present invention.) This light reflects from the target and is focused by the objective back to the point from which it came. This is simultaneously true for each disc hole in the illumination area as is the normal effect of cat's-eye retro-reflectors. A beamsplitter provides that the returning light is also focused to a similar pattern lying in a plane at or near the viewing area of the disk. Any proper combination of objective lens and target will constitute an equivalently effective cat's-eye retro-reflector. Thus the exact position of the reflected plane pattern imaged at or near the viewing area is determined only by the adjustment of the beamsplitter and various mirrors of the system. This reflected plane pattern may be thought of as a mapping of the illumination area of the disc to the viewing area.

It is apparent that the reflected plane pattern may be out of position in any of six degrees of freedom. These degrees of freedom are defined as rotation or translation on each of three axes. Accordingly, the component mounting apparatus is provided with six adjustments to accomplish such rotations and translations. These six adjustments act on the members employed to direct the reflected plane pattern to the viewing in order to precisely direct the individual disc hole images to their desired locations. Additionally, the degree of non-interaction between adjustment members, the majority being independently referenced to the main frame, results in substantial improvement in ruggedness and temperature stability. These six adjustments are exclusive of the disc centering adjustments described later.

Referring to the position of the reflected plane pattern or mapping, in the subsequent description of the embodiment, rotation around either of the two axes parallel to the flat surface of the disc (the X and Y axes) is termed keystoning because misadjustment with respect to these axes causes a square pattern of illumination pinpoints to be mapped to the shape of a keystone at the point of intersection of the reflected beam and the disc. Rotation around an axis perpendicular to the disc (the Z axis) is termed rotation, for purposes of defining the adjustment scheme herein. Translation along the X and Y axes is defined as position adjustment, and translation on the Z axis perpendicular to the disc is termed size adjustment. Translation on the Z axis also affects the focus of the pattern, but the apparent size of the pattern at the plane of the viewing area is more critical.

In the present invention, keystoning is adjusted by tilting a mirror mounted on the main frame. Position is adjusted by moving the entire scanning disc in either the X or Y direction, again referenced to the main frame. Size and rotation are adjusted by moving a tilt plate on which the beamsplitter and one other mirror are mounted. This tilt plate can be translated along the Y axis and tilted on the Y axis.

The alignment process of this invention utilizes cues received from observing various light patterns within the microscope and is simplest if keystone, rotation, position, and size adjustments are made in a logical order. The process also relies on certain coarse adjustments having been made during assembly of the microscopes, which adjustments would normally not be subject to variation outside the range of the adjustments described by this invention.

The first stage of the alignment process consists of making the keystone adjustment by removing the objective lens, looking into the lens mounting hole, and observing the reflections of the viewer's eye from the surface of the shiny disc used in this invention. Since reflections of the eye will be originating in both the illumination area and viewing area via the beamsplitter, the presence of two images of the viewer's eye indicates the need to tilt the keystone adjusting mirror until the images are exactly superimposed. None of the subsequent adjustments will affect the keystone adjustment.

Keystone adjustment is one of the most difficult when the prior art adjustment procedure utilizing the red and green lights is followed. Thus the use of a shiny disk and following the keystone adjustment process of this invention is valuable even if prior art is followed in the other adjustments.

The remaining adjustments are made with the microscope fully assembled and arranged to observe a high-quality mirror as the target. Again, the objective and the target mirror act as a cat's-eye reflector. The need for and degree of adjustment necessary for size, rotation, or position are determined by observing and interpreting the Moire patterns caused by the pinpoints of reflected light striking the rotating disc and becoming visible at the eyepiece only when coincident with conjugate holes in the disc. It can be shown that very small offsets in size, position, and rotation of the pattern of reflected pinpoints in any combination, cause exaggerated movements of the area where pinpoints of light coincide with their conjugate holes, and thus appear as bright areas in the field of view when viewed through the eyepiece. It is this exaggerated response that permits easy analysis and precise adjustment.

The various adjustments to be made to achieve size, rotation and position are made in a specific sequence. The keystoning adjustment may affect other adjustments but none of the other adjustments affects keystoning. Therefore, keystoning is adjusted first. Rotation adjustment may affect subsequent adjustments but the size and position adjustment do not affect rotation. Therefore, rotation is adjusted second. Size adjustment affects only size. Position adjustment affects only position and precise centering of the disc relative to the shaft does not affect rotations, position keystoning or size of the pattern, that is, it affects only centering. Size, position, and disk centering are therefore adjusted last. Making these adjustments in this order ensures that once an adjustment is made, it need not be remade due to the effects of subsequent adjustments. Disc centering is done to meet the requirement that disc holes in the viewing area be exactly opposite disc holes in the illumination area where exact opposition is defined relative to the axis of rotation of the disc.

This process of observing the size and location of bright areas in the field of view, and of moving various adjusting screws of the independent elements of the apparatus of this invention until desired light patterns are obtained thus makes possible a rugged, stable tandem scanning reflected light microscope having disc holes as small as 20 microns in diameter that is easy to align without use of external light sources, and is capable of unique performance not attainable with other tandem scanning reflected light or other microscopes.

BRIEF DESCRIPTION OF THE DRAWINGS

FIGS. 5A-5E are various views of the mainframe with the size and rotation adjustment apparatus added.

DETAILED DESCRIPTION OF THE ILLUSTRATED EMBODIMENT

1. The Mounting Structure and Adjusting Apparatuses

Figure 1:
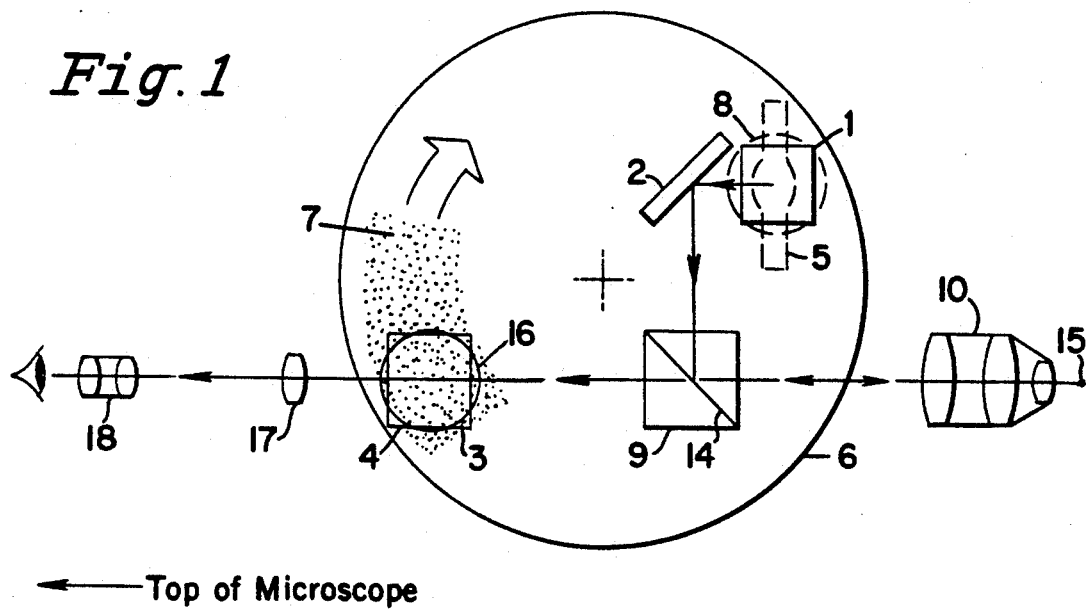
FIG. 1 is a front view of the instrument of this invention showing only principle optical components.
Figure 2:
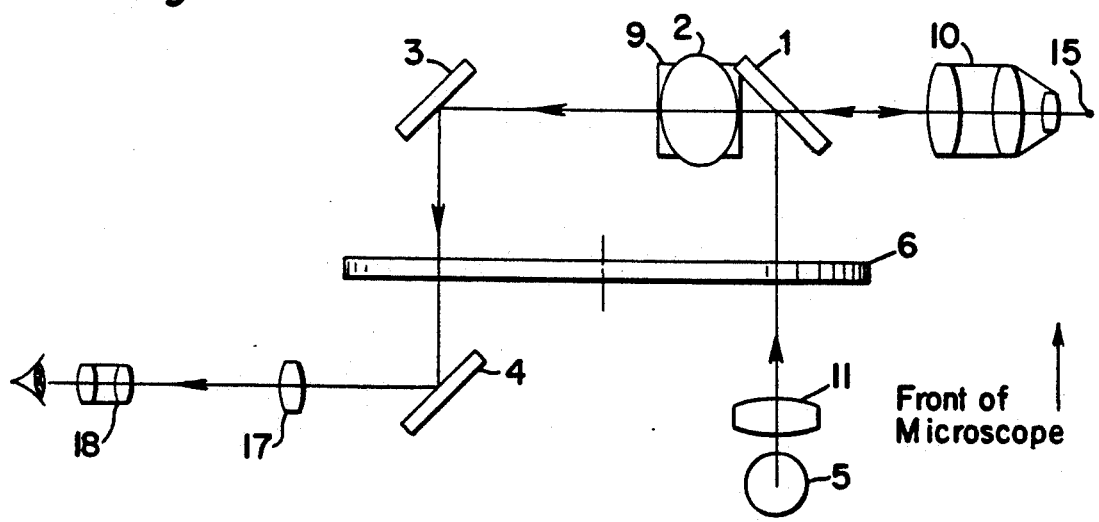
FIG. 2 is a side view of the instrument of this invention showing only principle optical components.

Referring to FIGS. 1 and 2 there is illustrated the tandem scanning reflected light microscope of this invention with main light paths and principle optical components, without supporting structure and alignment means shown. Light originating from a lamp 5 passes through a condenser lens 11 to a rotating scanning disc 6 into which large numbers of very small apertures 7 have been etched or otherwise inserted. Light passing through the apertures 7 in the illumination area 8 reflects from mirror 1 to mirror 2, reflects from mirror 2 to the beamsplitter 9, and reflects from the partially reflecting surface 14 of the beamsplitter 9 to the objective lens 10. The objective lens illuminates the target 15 with points of light which are an image of the disc holes 7 in the illumination area 8. Light reflecting from the target 15 is focused by the objective lens 10, passes through the beamsplitter 9 to mirror 3, reflects from mirror 3 and forms an image at the viewing area 16. The points of light illuminating the target 15 are thus focused onto the disc holes 7 at the viewing area 16. The light passing through the disc holes 7 at the viewing area 16 is then reflected from mirror 4 to a relay lens 17 and an eyepiece 18 where the image is observed, the rotation of the disc creating a scanning effect and complete image formation.

Figure 3A:
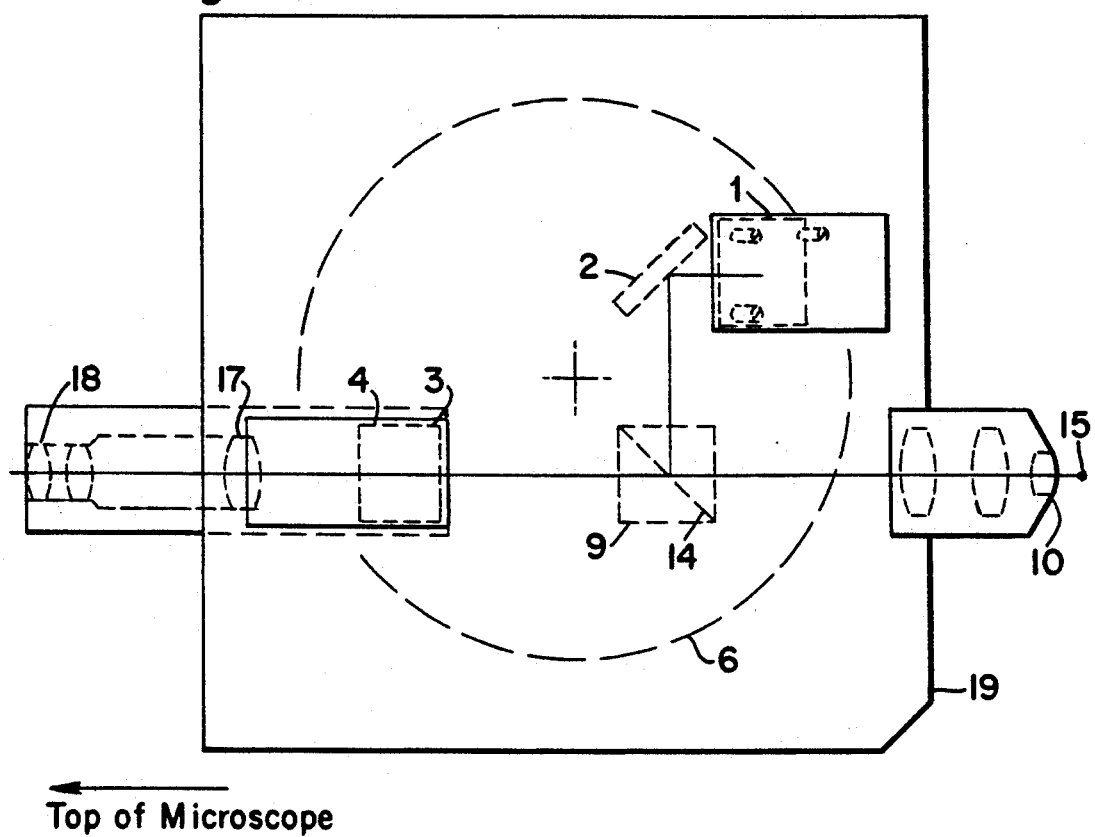
FIGS. 3A and 3B are front and side views respectively of the mainframe of the invention.
Figure 3B:
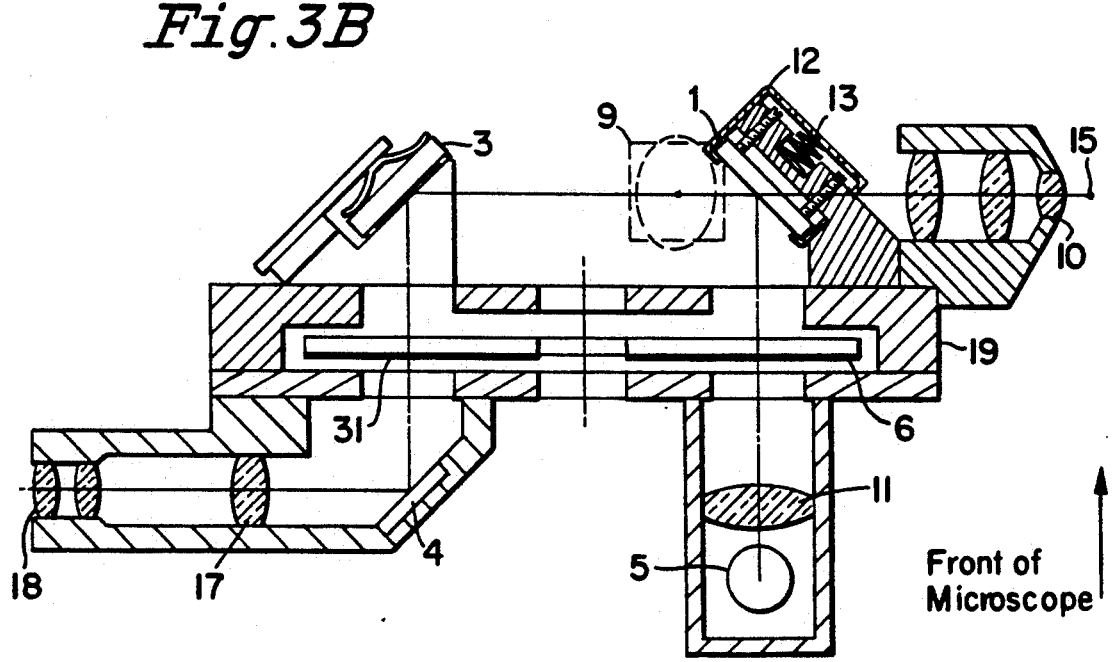

Referring to FIGS. 3A and 3B, there is illustrated the mainframe 19 of the support structure of the present invention, comprising a rugged plate to serve as the reference for all critical elements of the microscope, and to which are attached fixed 45 degree mirror 3, and a 45 degree adjustable mirror 1. Also attached to the mainframe are various other elements of this invention, including the optical elements, for precisely adjusting size, rotation, and position of the mapping of the disc holes so as to complete the desired optical path. These elements are described in subsequent paragraphs. Mirrors 1, 2, 3, and beamsplitter 9, and the disk 6 are the elements critical to the proper adjustment of the microscope. The exact position of other elements such as the eyepiece, the objective, and the condenser lens is not critical to proper alignment. In fact, an alternative system places the objective in front of the unused side of the beamsplitter. If the described system is in alignment, the alternative system is also in alignment.

Nominally the centers of mirrors 1, 2, 3, the center of the beamsplitter 9 semi-reflecting surface 14, and the optical axis of the objective lens should all be in a plane parallel to the disc. Also, nominally, the plane of mirror 2 and the beamsplitter semi-reflecting surface 14 intersect at right angles defining a line co-linear with the axis of rotation of the disc. These components may vary from their nominal position as the microscope is adjusted. In addition, if the mounting of these components is not exact, the various adjustments described herein will compensate for the errors so that standard art can be used for component mounting.

One easy way to make the shiny disc required by the keystone adjustment procedure of this invention is to etch holes in the metal coating of a metal coated glass disc. Prior art is based on the use of a disc made of solid opaque material with through-holes etched or otherwise drilled. These discs do not afford the specular reflection required for easy keystone adjustment. When a metal-coated glass disc is used, the metal-coated surface 31 should be facing the light source and eyepiece. The metal-glass interface provides the specular reflections required. The etching of chromium on glass is a common practice.

Figure 4A:
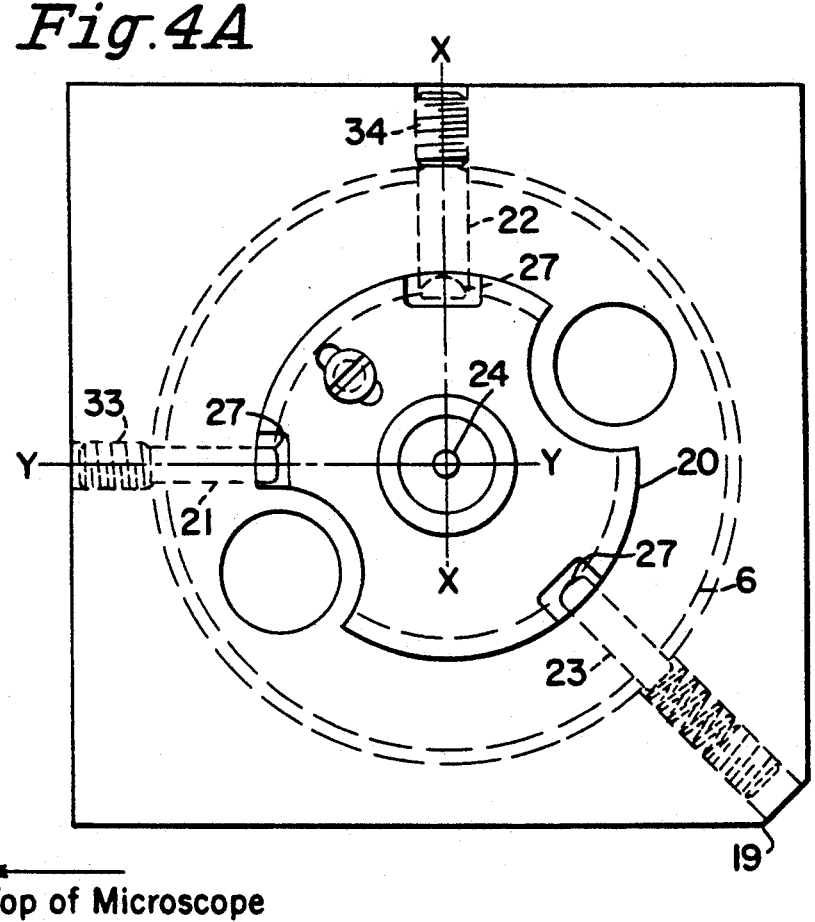
FIGS. 4A and 4B are front and side views respectively of the mainframe of the invention with the position apparatus and disc added.
Figure 4B:
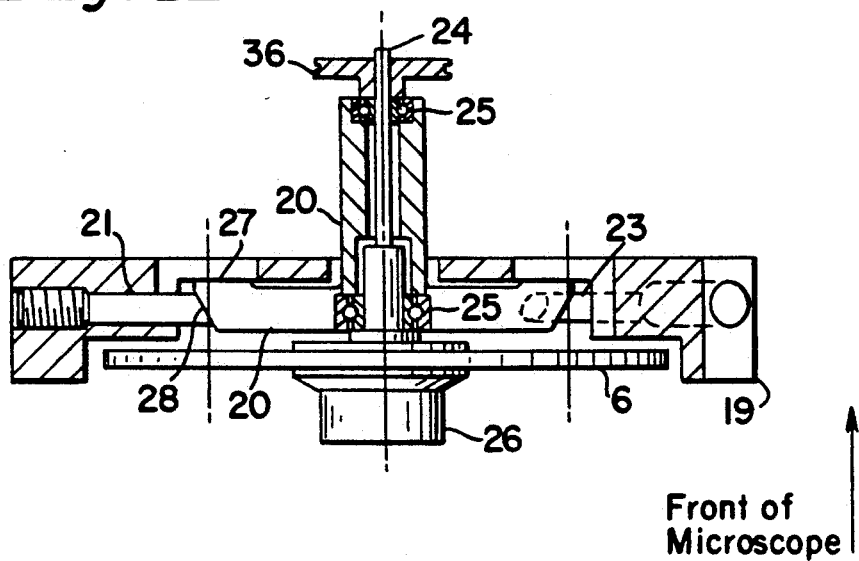

Referring to FIGS. 4A and 4B, there is illustrated the apparatus for adjusting position, with the scanning disc 6 attached thereto. The position adjusting apparatus comprises a compound 20, slidable in the X and Y axes, by means of screw-adjustable slide pins 21 and 22 and opposing spring-loaded slide pin 23, whose faces conform to the slope of the compound to hold the compound in close contact with the mainframe, and to cause very small X and Y movement when the screws 33 and 34 are turned. Additionally, spring-loaded slide pin 23 holds the compound in tight contact with slide pins 21 and 22. Slide pins 21 and 22 have spherical surfaces in contact with their adjustment screws 33 and 34, which surfaces minimize twisting torque when the adjusting screws are turned. Pins 21 and 22 must be closely fitted in their respective holes in the mainframe so as to limit their lateral movement as the compound is adjusted. The scanning disc 6 is centered on a shaft 24, bearings 25, and hub 26 within the compound. Movement of the compound caused by adjusting the slide pins accomplishes the desired X and Y translation of the disc in a rugged, stable, and very precise manner, with respect to the mainframe, and independent of any other adjustments.

The compound 20 has three pads 27 formed on the front surface, which pads slidably contact the rear surface of the mainframe 19, thus providing stable three-point support. These pads should have a contact area with the mainframe 19 of approximately ⅛ square inch each in order to establish thermal equilibrium between the compound and the mainframe. One of these pads 27 should be located directly under each of the pins 21, 22, and 23. Additionally, the periphery of the compound is formed conically, resulting in an angled surface for line contact with the slide pins 21, 22, and 23 at line contact points 28, tightly constraining the pads against the mainframe. The total included angle of the conical surface should be between 40 and 50 degrees.

There may also be required a keeper slot 29 in the compound, with a keeper screw 30 in the slot in order to prevent excessive rotation of the compound 20. As the compound is moved by means of the adjusting screws 33, and 34, its motion requires that it slide on the face of at least two of the pins 21, 22, and 23. If the compound is constrained to slide on the face of all three pins 21, 22, and 23 as it is adjusted, the friction will be increased. Screw 30 should be located on a line between the face of pin 21, and the faces of pin 22 and slot 29 should be aligned perpendicular to that line, thus allowing the compound 20 to rotate about either the face of pin 21 or the face of pin 22 as the compound is moved. A drive pulley 36 mounted on shaft 24 provides an interface for rotating the disc. All materials in the mainframe 19, the compound 20, and slide pins 21, 22, 23 must be of the same or nearly the same coefficient of thermal expansion to provide thermal stability.

Referring to FIGS. 5A through 5E, there is illustrated the apparatus of this invention that permits both size and rotation adjustment. The apparatus consists of a tilt plate 37, of sufficient thickness and strength to resist bending, slidably mounted on rods 38 and 39 that are fixed to the mainframe 19 in "V" grooves so as to limit the tilt plate to motion in the Y-direction and rotation around the rods 38 and 39. Rods 38 and 39 are co-linear and their axis intersects the axis of rotation of the disk. The tilt plate 37 is held against the rods in its "V" notches by screws and springs 43. The axis of the "V" notches in the tilt plate intersects the line of intersection of the planes of surfaces 14 and 2. Thus, the intersection of the planes of surfaces 14 and 2 is not displaced in the X-direction due to thermal expansion or contraction of the tilt plate. The adjustment of the microscope is an order of magnitude less sensitive to displacement of the intersection in the Y-direction. To the tilt plate 37 are mounted the beamsplitter 9 and fixed 45 degree round mirror 2. The tilt plate 37 is permitted to rotate adjustably around the rods 38 and 39, causing rotation adjustments, such adjustments being controlled by a screw 40, nut 41, washer 46, and leaf spring 42. The bottom surface of nut 41 is spherical, engaging the spherical surface of washer 46, thus allowing full surface contact of washer 46 to tilt plate 37 surface during tilt. The area of contact between the tilt plate and rod 38 should be separated from the area of contact between the tilt plate and rod 39 by some distance to ensure a firm control of the position of the tilt plate. Therefore rods 38 and 39 are short and separated by the maximum amount allow by the size of the tilt plate.

Figure 5C:
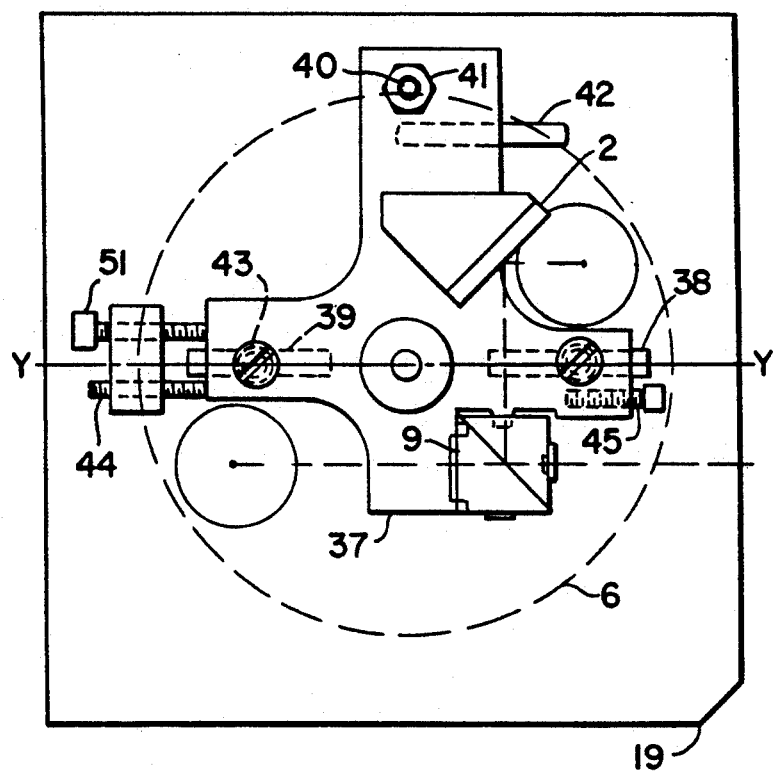
Figure 5C:
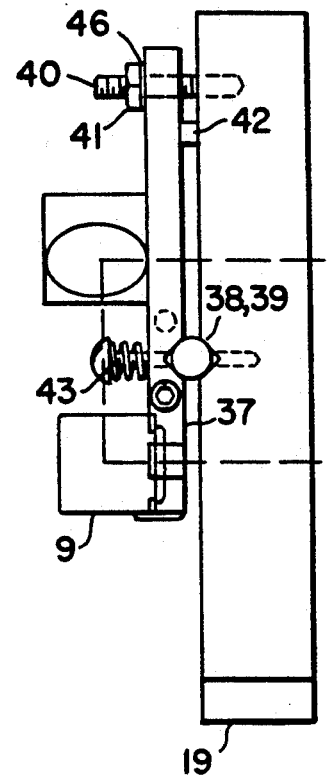
Figure 5C:
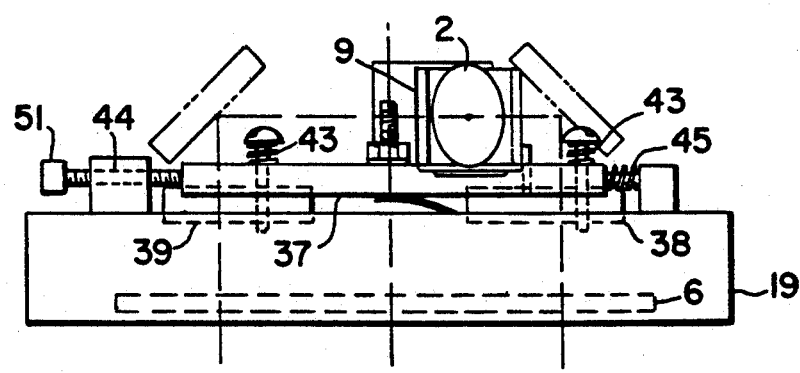
Figure 5D:
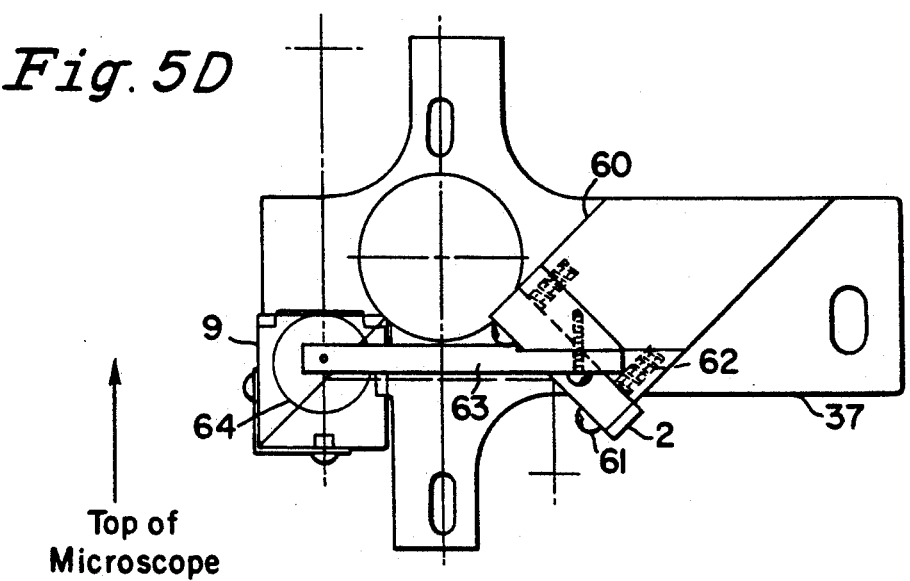
Figure 5E:
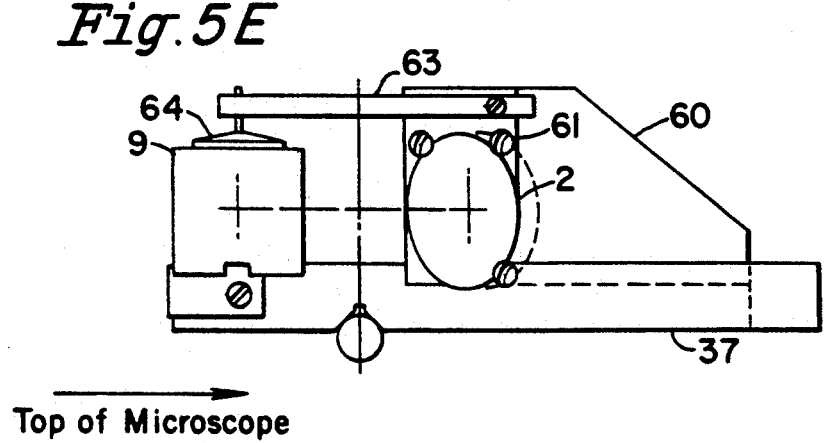

As shown in FIGS. 5D and 5E, the beamsplitter 9 is held to the tilt plate by a bar 63 and conical disc spring 64 extending from the 45 degree round mirror mount to the top of the beamsplitter. The spring 64 is shaped so as to evenly distribute hold-down forces. The mirror mount 60 is also of sufficient thickness and strength to resist bending forces applied by the arm. The round mirror is mounted to the mirror mount with conventional three-point support provided by screws 61 and springs 62.

To cause size adjustments, movement of the tilt plate along the Y-axis is permitted, controlled by a size adjustment screw 44, set in a block attached to the mainframe. Spring 45 holds the tilt plate against the adjustment screw 44. Adjustment screw 51, mounted in the same block as adjustment screw 44 is used to temporarily displace the tilt plate (and the size adjustment) during the alignment process, but is withdrawn after all adjustments are made.

Figure 6:
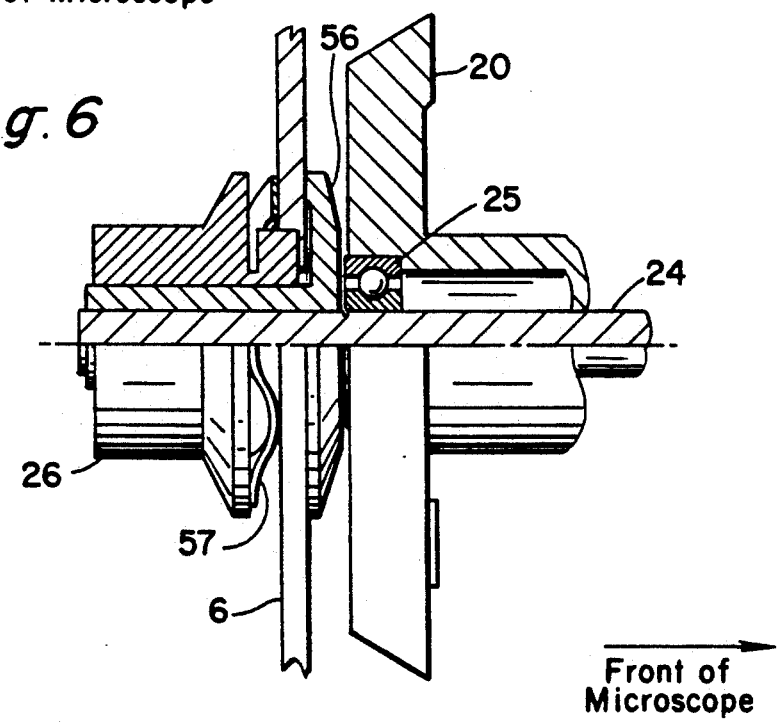
FIG. 6 is a side view of the hub assembly, disc, shaft, bearings, and compound installed together.

Referring to FIG. 6, there is illustrated a disc mounting apparatus that permits centering of the disc to within 1 micron, with relation to its axis of rotation. The apparatus comprises a hub assembly 26 that mounts to the disc 6 and a shaft 24, all of which rotate on ball bearings 25 within the compound 20. In order to constrain the disc to lie in a plane perpendicular to the shaft, the flange 56 of the hub assembly is mounted in direct contact with the disc, and a wavy washer 57 is located on the opposite surface of the disc to force the disc against the flange. Various adjusters illustrated in FIG. 7 are incorporated that facilitate fine motion of the disc in a plane perpendicular to the shaft.

Figure 7A:
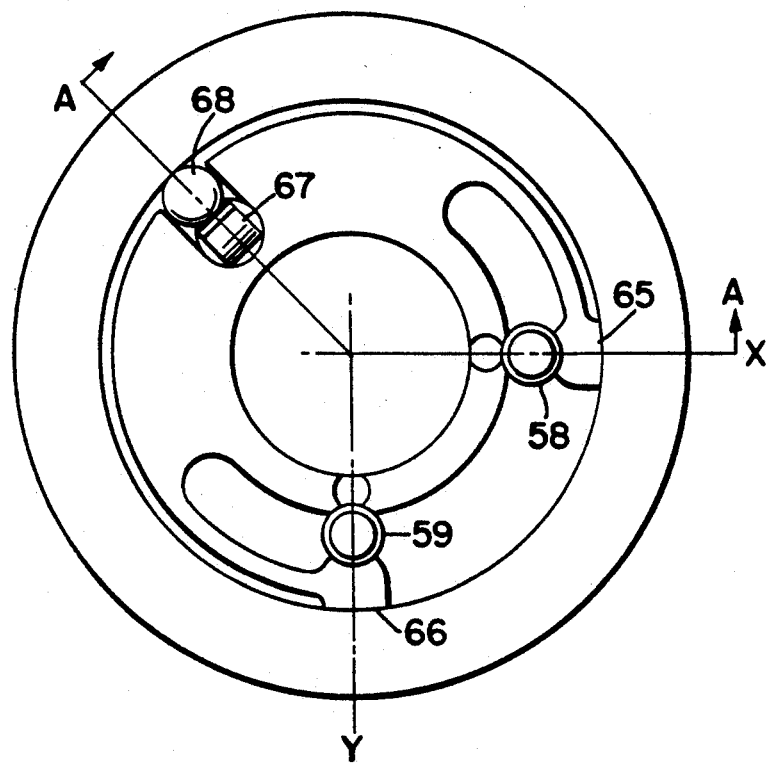
FIG. 7 is a front and cross-section view of the hub assembly and FIG. 7A is a sectional view along Section Line A—A of FIG. 7.
Figure 7B:
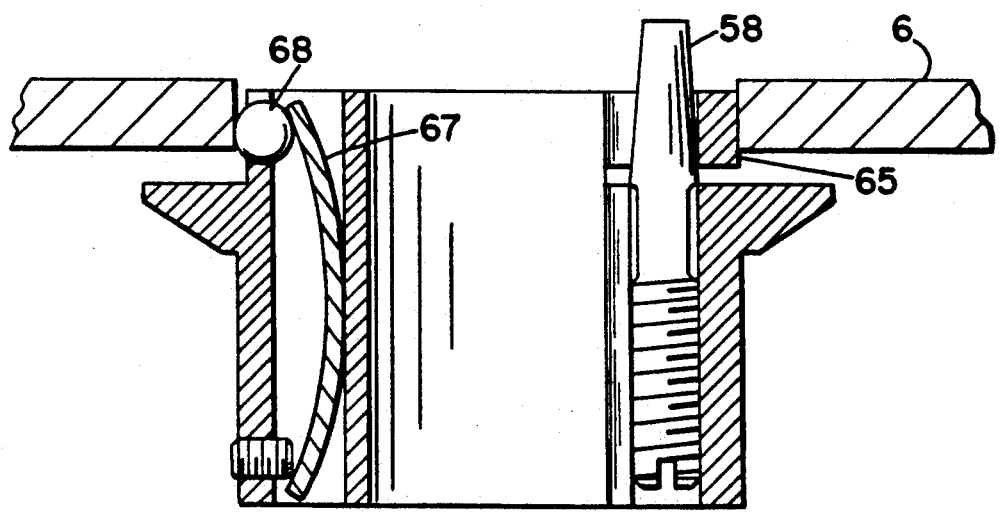

Referring to FIG. 7, to move the disc 6 in the X and Y directions as required for centering on the shaft, there are provided two taper screws 58 and 59. The screws are sufficiently tapered as to provide very sensitive adjustments. They are oriented at 90 degrees and press against spring pads 65 and 66 in the hub that contact the edges of the center hole of the disc, thereby causing X or Y movement in very small increments as the screws are rotated during the centering procedure later described. A spring 67 and ball 68, located 135 degrees from either taper screw oppose the motion, thus assuring that the disc stays in contact with the spring pads.

Figure 8:
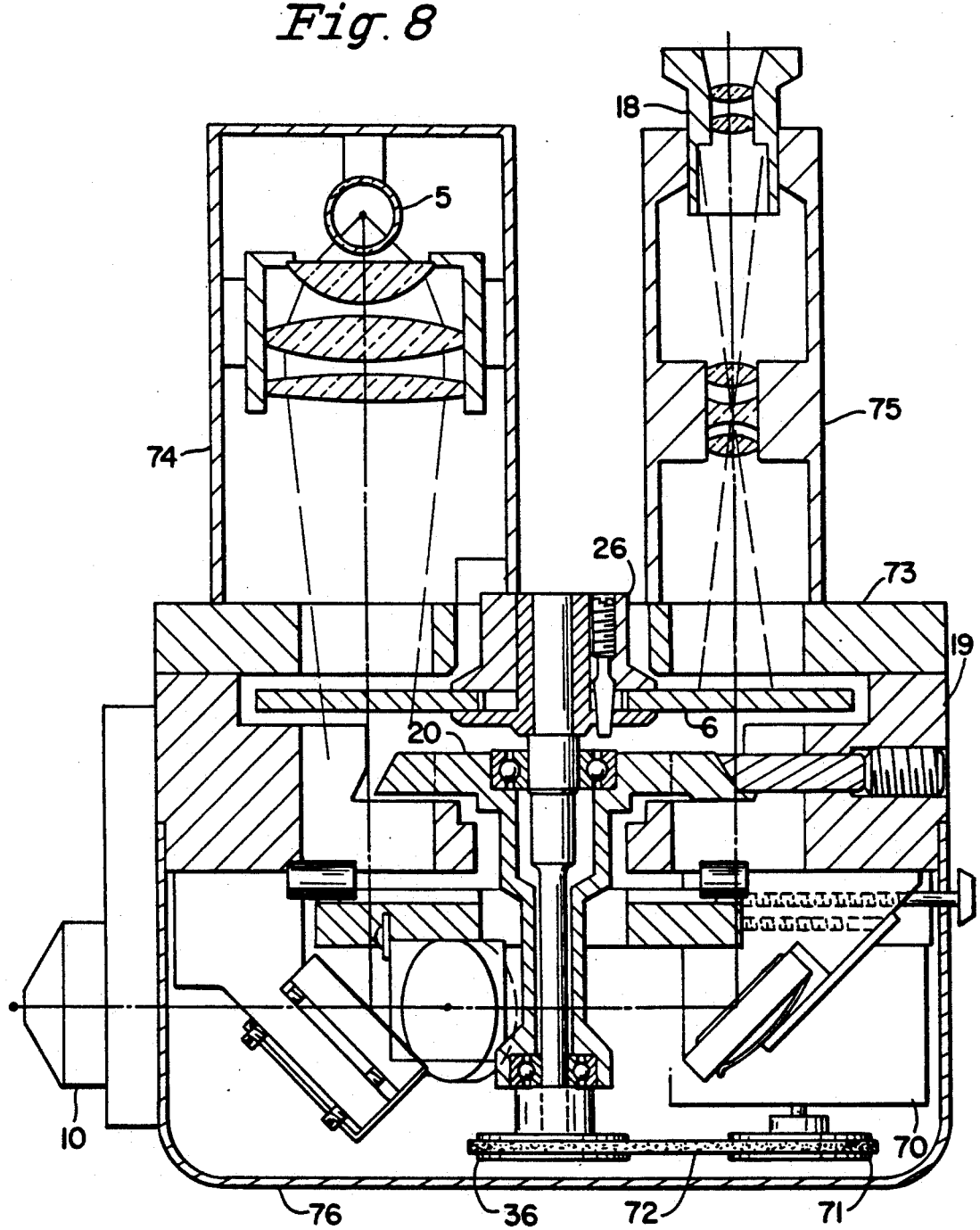
FIG. 8 is a general layout of the essential elements of the assembled confocal tandem scanning reflected light microscope.

Referring to FIG. 8, there is illustrated the general layout of the assembled microscope in partial cross-sectional view. Some principle parts of the microscope described earlier are re-identified in FIG. 8, for clarity. These are the mainframe 19, disc 6, compound 20, objective lens 10, lamp 5, and eyepiece lens 18. In addition, the parts needed to complete a working microscope are shown. A drive motor 70, drive pulley 71, and drive belt 72 power and rotate the disc via pulley 36. A mounting plate 73 joins mainframe 19 to a lamphouse 74 and viewing tower 75, which in turn supports eyepiece 18, and optionally a video or other type of camera. The mirror 4 described earlier is not shown in this view, for clarity. Dustcover 76 protects the optical components. The additional components shown in FIG. 8 are well known in the art and are not further described here. Pulley 36 and hub 26 should be accessible to allow adjusting the disc centering when all essential parts of the microscope are assembled, pulley 36 being used to rotate the disc by hand as required.

The above described apparatuses, installed on the mainframe with the other noted elements comprise a rugged, stable, easily alignable tandem scanning confocal microscope, wherein the scanning disc holes may be as small as 20 microns in diameter, when used with a properly centered scanning disc in conjunction with the alignment method described further herein.

In addition the portion of the apparatus containing the beamsplitter 9, the disc assembly, and mirrors 1, 2, and 3 along with the required mounting and adjustment mechanisms and disc motor can be used in many forms. The objective lens or an objective lens turret can be used in proper relation to either externally available side of the beamsplitter. The viewing area and the illumination area may be interchanged. Binocular eyepieces, a film camera, or a television camera may be used. None of these variations will affect the alignment requirements. In fact a television camera could be used to carry out most of the adjustments as described below.

2. The Microscope Alignment Process

The following paragraphs describe the details of the process by which adjustment of the individual elements described above is made to achieve complete, precise alignment of the microscope having disc hole diameters as small as 20-microns. While the previous paragraphs describe the physical structure and mounting and adjustment embodiments for the microscope components, in order to best use the embodiments, the operator must obtain and analyze information provided by the microscope to ascertain when adjustments are needed, which adjustments are needed, and how much adjustment is needed. This invention illustrates a method of analyzing reflections from the disc, and Moire patterns appearing at the eyepiece side of the scanning disc, to guide the alignment process.

Referring to FIGS. 1 and 2, the area 16 of the scanning disc was previously identified as the viewing area. Similarly, the area of the disc 8 was defined as the illumination area. For the purpose of alignment a flat first surface mirror, (a mirror with the reflective surface on the front of the glass) located at or near the focal plane of the objective lens, is used as a target. In normal operation of the microscope, as previously described, light from the illumination source 5 is reflected from mirrors 1 and 2, and beamsplitter 9, is imaged onto the target by the objective lens 10. Points of light thus formed are reflected from the target and imaged by the objective through the beamsplitter, off mirror 3 and onto the disc at the viewing area. Thus, the illumination area can be said to be mapped to the viewing area. In a fully aligned microscope, the points of light from the disc holes at the illumination area would be exactly coincident with the disc holes at the viewing area. This alignment of holes remains even as the disc spins on its axis. The view through the eyepiece would be that of a uniformly illuminated bright area filling the viewing area.

In a misaligned microscope, the pattern of disc holes mapped to the viewing area may be rotated or translated on any of the three axes due to misalignment of individual components in the path. Some of such mapped disc holes may by chance happen to align with other disc holes in the viewing area. In general when one disc hole is aligned perfectly, other nearby holes will have some degree of overlap due to the repetitious patterns of disc holes used in discs designed for this type of microscope. Such is the case with the disc described in co-pending patent application Ser. No. 07/497,318. The result is that when a bright area is seen through the eyepiece, it will comprise many disc holes. The view through the eyepiece may then be that of one or more illuminated bright areas. These bright areas constitute a Moire pattern.

Many of the bright areas may result from the chance alignment of disc holes which would not align in a well-adjusted microscope. One such bright area will, however, always exist when disc holes are properly aligned. This one bright area will always comprise many disc holes regardless of the design of the disc hole pattern. The Figures described below illustrate the behavior of this one bright area in response to the adjustment of the microscope. Analysis of this view of the unique Moire patterns formed when the microscope is focused on a high-quality mirror is a major factor of this invention for adjusting tandem scanning reflected light microscopes.

Figure 9:
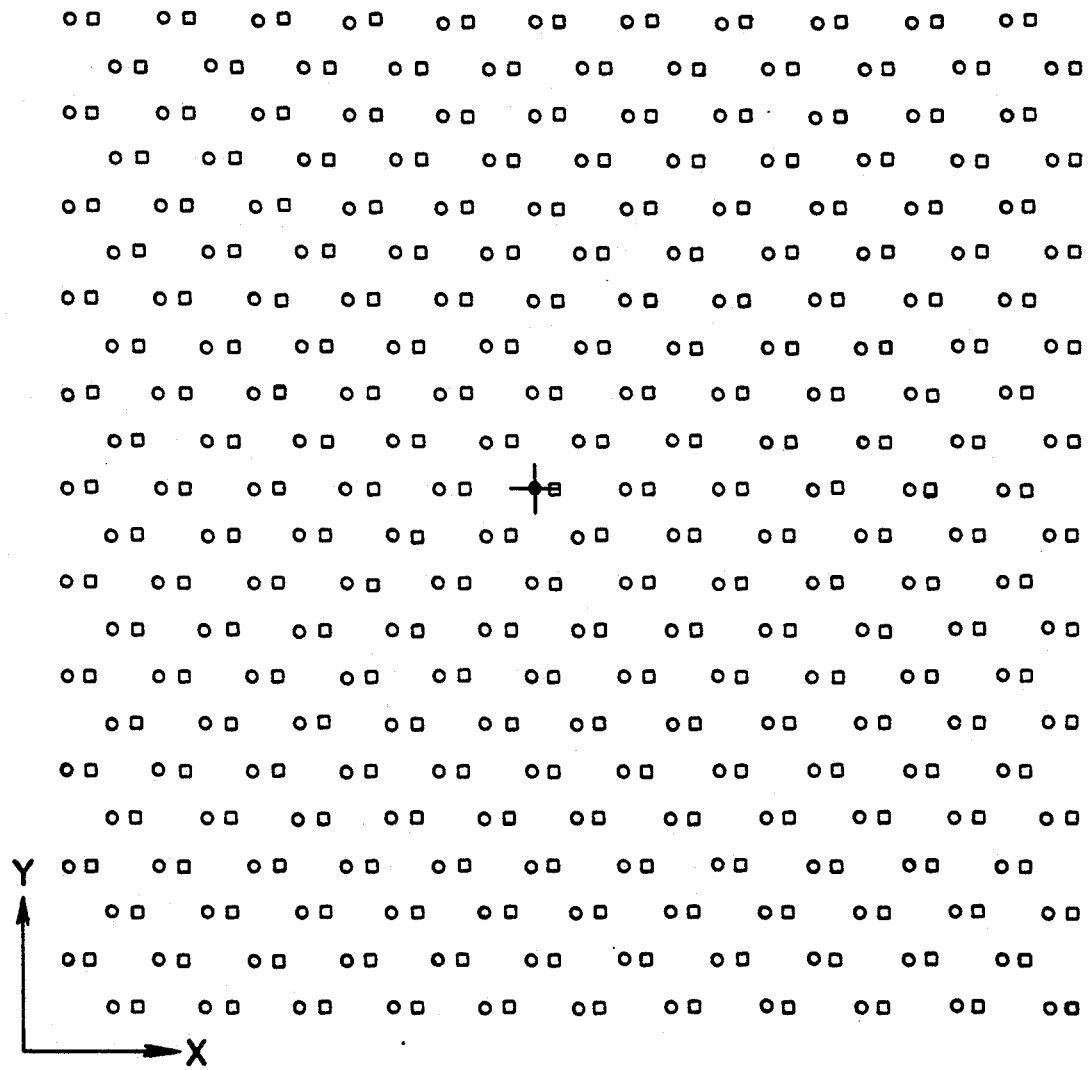
FIG. 9 illustrates the mapping of the illumination area of the disc onto the viewing area of the disc when the pinpoints of reflected light are slightly out of adjustment in the X direction.

FIG. 9 shows the condition when the illumination area disc holes are out of adjustment in the X direction. Squares are used to represent the disc holes of the illumination area as mapped onto the viewing area and circles to represent the disc holes of the viewing area of the disc. The cross represents the center of the field of view. Under this condition of misalignment, no light would be visible through the eyepiece.

Figure 10:
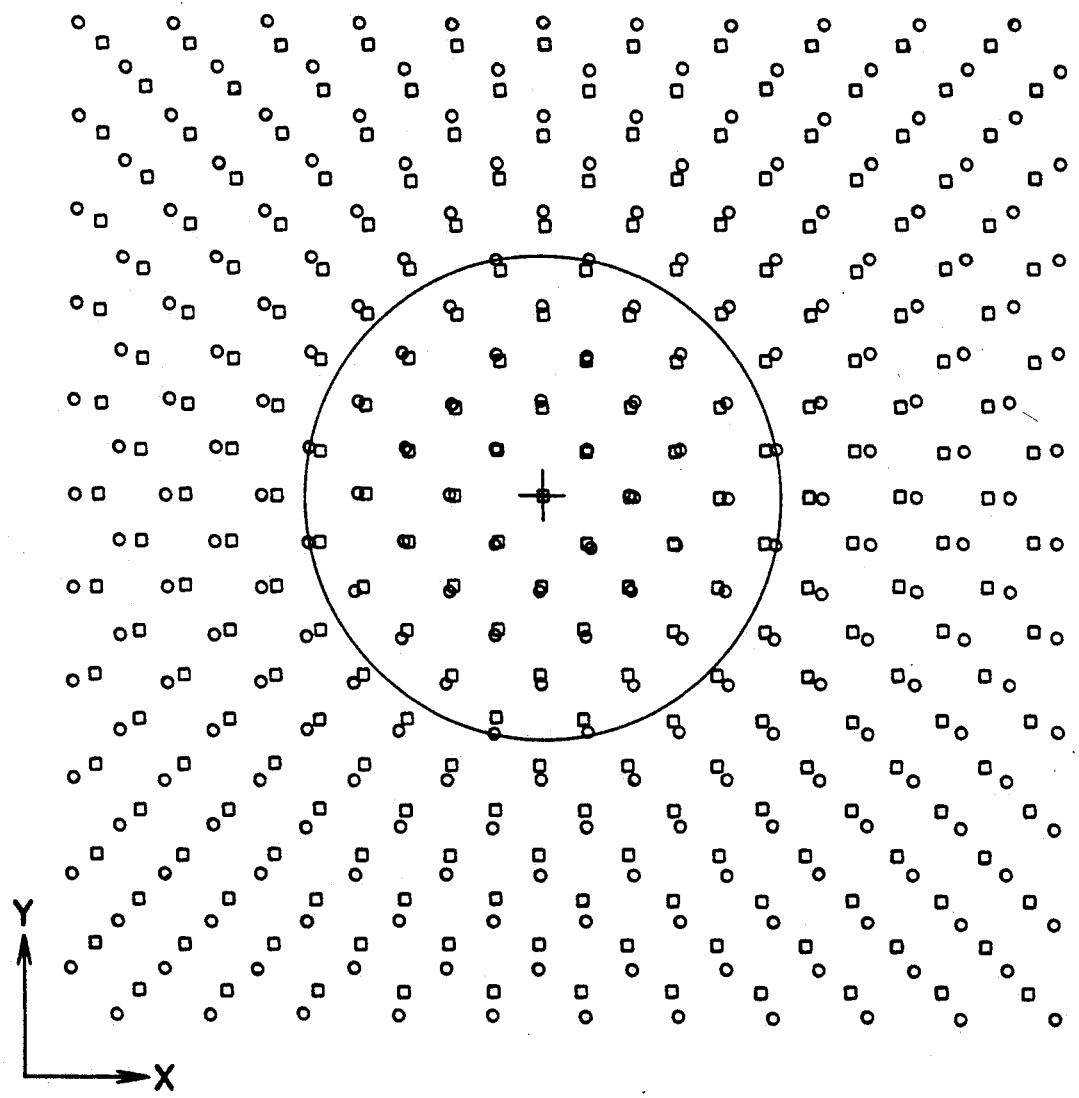
FIG. 10 illustrates a condition of misalignment where the pattern of mapped disc holes is in the correct position, but is 5 percent too small (95 percent of the correct size).

FIG. 10 shows a condition of misalignment wherein the illumination area disc hole pattern is mapped in the correct position, but is 5 percent too small. In this example, the disc holes near the center of the field of view are in alignment, but farther from the center the misalignment becomes complete. Looking through the eyepiece, one would see a bright area of light in the center of the field of view, representing the area of coincidence.

Figure 11:
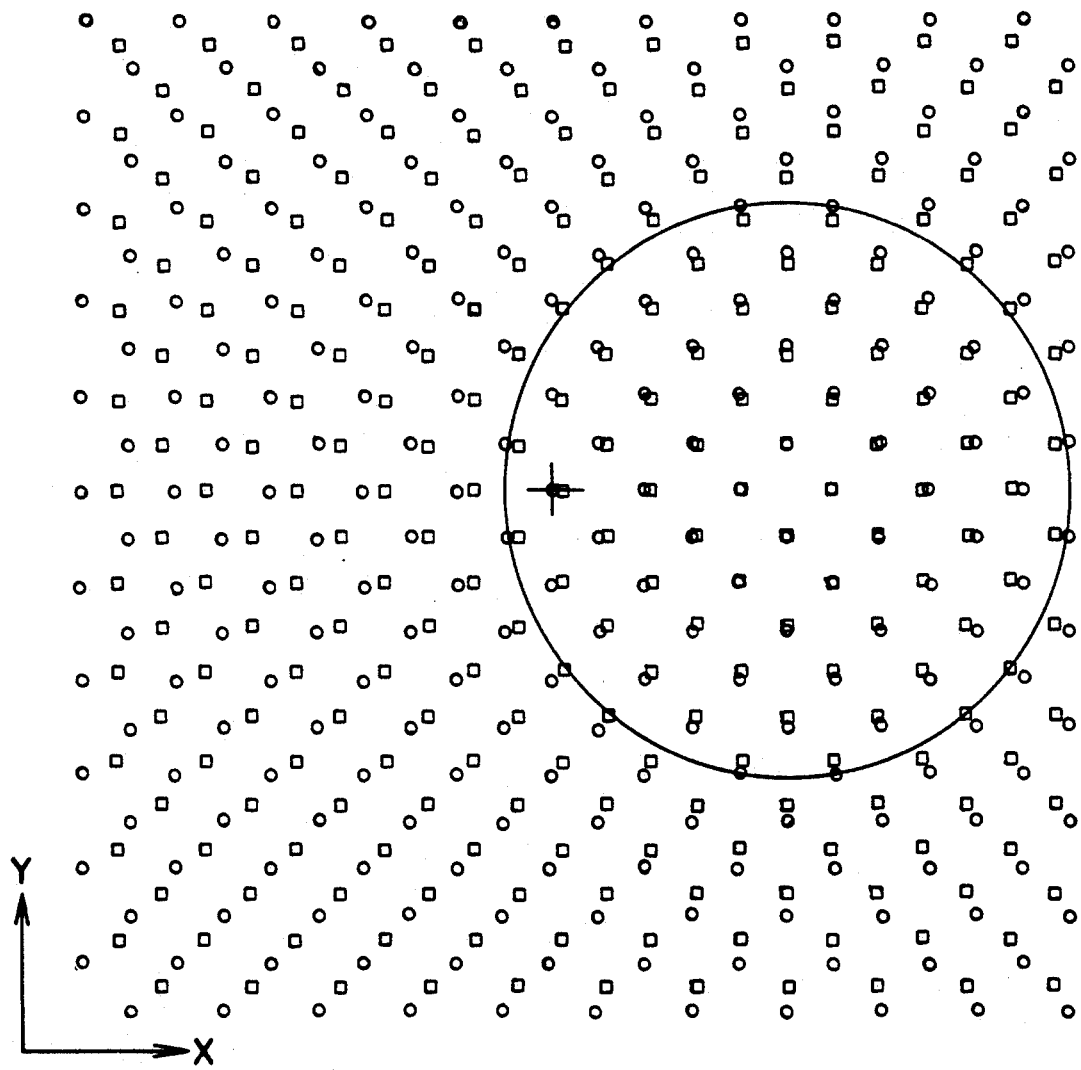
FIG. 11 illustrates a condition wherein the pattern of mapped disc holes is 95 percent of correct size and shifted to the right by one hole diameter.

FIG. 11 shows the illumination area mapped onto the viewing area with the disc hole pattern approximately 5 percent too small and out of position to the right by about one hole diameter. Under these conditions, the bright area is shifted to the right of the center of the field of view. The shift of the bright area to the right is many times the diameter of one hole, an important exaggerated effect which is used not only to identify the misalignment, but also to indicate very small changes as fine adjustments are made; thus, precise alignment becomes possible while observing the movement, size, and position of the bright area with reference to the center of the field of view.

Figure 12:
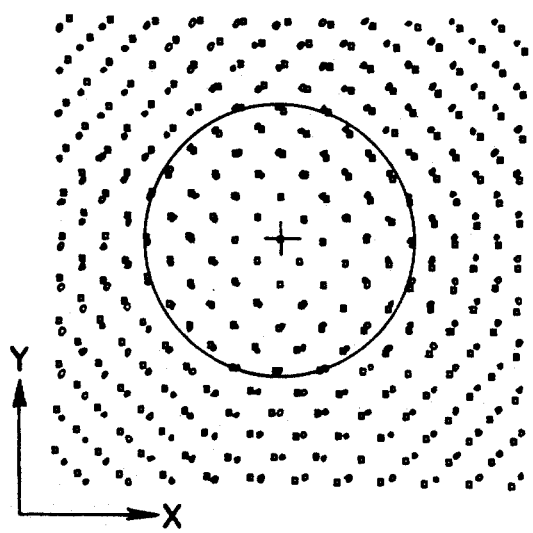
FIG. 12 illustrates a condition wherein the pattern of mapped disc holes is in the correct position and of the correct size, but is rotated clockwise by 2.5 degrees.

FIG. 12 shows the illumination area mapped onto the viewing area where the disc hole pattern is in the correct position and of the correct size, but rotated 2.5 degrees clockwise. A bright area in the center of the field of view results.

Figure 13:
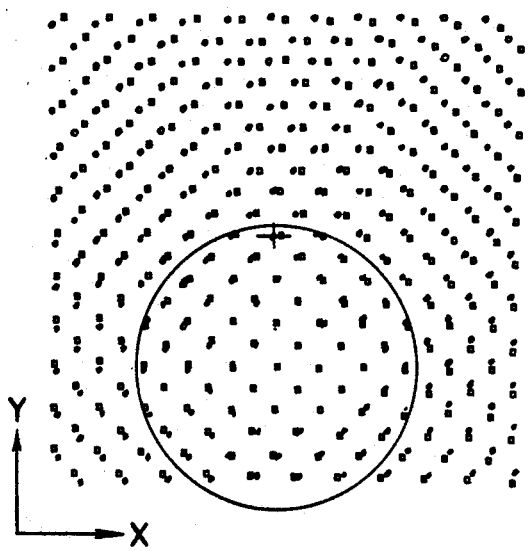
FIG. 13 illustrates a condition wherein the pattern of mapped disc holes is of the correct size, is shifted to the right by one hole diameter, and is rotated clockwise by 2.5 degrees.

FIG. 13 shows the illumination area mapped onto the viewing area where the disc hole pattern is of the correct size, is rotated 2.5 degrees clockwise, and is shifted to the right about one hole diameter. The bright area is shifted downward from the center of the field of view.

Figure 14:
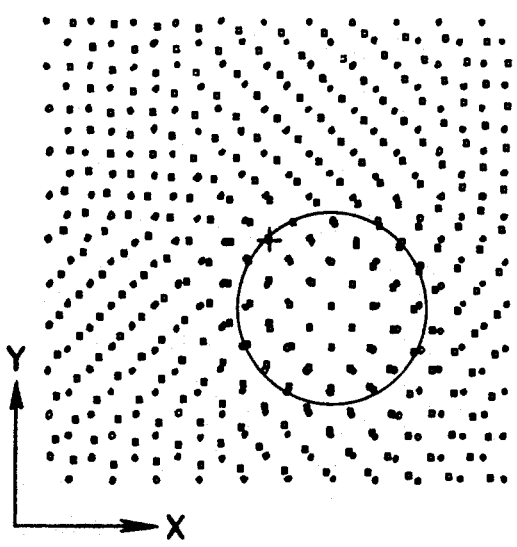
FIG. 14 illustrates a condition wherein the pattern of mapped disc holes is at 95 percent size, rotated 2.5 degrees, and shifted one hole diameter to the right.

FIG. 14 shows the illumination area mapped onto the viewing area 5 percent too small, rotated 2.5 degrees, and shifted to the right by one hole diameter. In this case, the bright area is shifted down and to the right. FIGS. 10, 12, and 13 show how the response of the bright area to the position adjustment can be used to detect misadjustment of rotation. If the bright area moves exactly in the X direction in response to the X position adjustment the rotation adjustment is correct. If the bright area moves in the Y direction or diagonally when the X position adjustment is used, then rotation is misadjusted.

Figure 15:
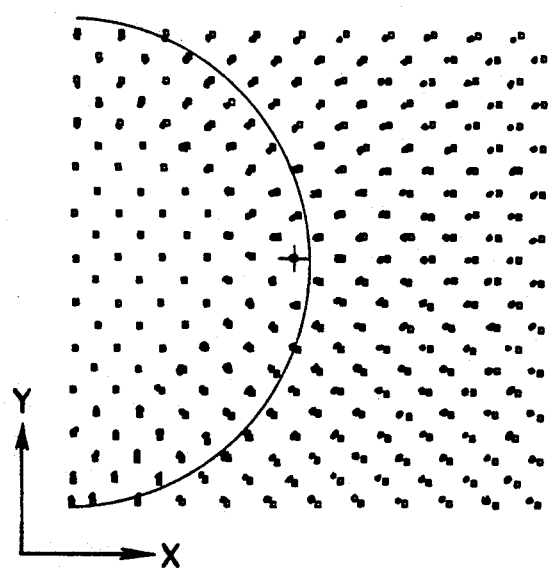
FIG. 15 illustrates a condition wherein the pattern of mapped disc holes is at 102 percent of the correct size and shifted one hole diameter to the right.

FIG. 15 shows the illumination area mapped onto the viewing area 2 percent too large and shifted to the right by one hole diameter. In this figure the bright area has moved to the left. A comparison of FIGS. 11 and 15 shows how the bright area can be used to identify size misadjustment. In FIG. 15 the bright area is larger than in FIG. 11 indicating that the size misadjustment is greater in the case of FIG. 11 than in the case of FIG. 15. In addition, in FIG. 11 the bright area moves to the right in response to misadjusting the illumination area mapping to the right, indicating that the mapping is too small. In FIG. 15 the bright area has moved to the left in response to misadjusting the illumination area mapping to the right, thus indicating that the mapping is too large. In fact the bright area may be larger than the field of view and the size adjustment still not be perfect. In this case the bright area can still be moved by the position adjustments. If the mapping position is moved to the right and the left side of the field of view dims first, then the bright area is moving to the right and the mapping is too small. If under these same conditions the right side of the field of view dims first then the mapping is too large. When the size is in perfect adjustment, the bright area is, in effect, infinite and the entire field of view will dim uniformly in response to the misadjustment of position, as might be inferred from FIG. 9.

The preceding examples illustrate that by correlating the location and size of the bright areas appearing on the eyepiece area of the disc, the operator may determine the degree and type of misalignment of the disc holes, and importantly, may accomplish very precise alignment of the microscope by using the size, rotation, and position adjusting screws of this invention. This adjustment procedure is easy to use. The bright areas in the field of view are large, and the motions are large compared to motions of individual disc holes as mapped. Later paragraphs will describe the optimum order in which to make the adjustments.

The description of the Figures given above assumes that there is no misadjustment of keystone. Analysis of the bright areas can be used to identify misadjusted keystone, but the analysis is difficult, especially when the keystone misadjustment is combined with other misadjustments. A much simpler method for adjusting keystone is here described which is also a subject of this invention. This method requires that the microscope use a shiny disc or similar device to provide a specular reflection when viewed from the location of the objective lens.

The microscope has two optical axes. One optical axis is defined by the light path from the center of the objective lens to the center of the viewing area. The other optical axis is the light path from the center of the illumination area to the center of the objective lens. Ideally each of these axes should intersect the disc at right angles, in which case the keystone will be properly adjusted. The keystone will be correctly adjusted, however, if the two axes intersect the disc at correspondingly equal angles; that is, if one axis is tilted 1 degree, then the other should be tilted 1 degree in the opposite direction because of the image reversal which takes place in the mapping of the illumination area to the viewing area. Keystone misadjustment is detected by simultaneously viewing an image reflected from both the viewing area and the illumination area of the disc.

The simplest way to see these reflections is to remove the objective lens and look in the direction of the beamsplitter through the objective lens mounting hole. When so doing one can see the image of the viewer's eye reflected from the mirrored surface of the disc in both the viewing area and the illumination area. If these two images of the eye are exactly superimposed, the keystone is correctly adjusted. Using the mirror 1 adjustment screws, the mirror may be tilted until the two images coincide. The reflections can be viewed by an alternative means. FIG. 1 shows four sides of the beamsplitter 9. Three sides are used and one side is unused and unobstructed, this latter side being the side of the beamsplitter farthest from mirror 2. Thus when the objective lens is removed, two sides of the beamsplitter are externally available for viewing. The required reflections may be viewed though the unused side of the beamsplitter and the same adjustments made to the keystone. Alternatively, a lamp or other easily seen target can be placed in front of one of the externally available beamsplitter sides and its reflection viewed from the other externally available side. The images of such a lamp or target can be seen as reflected from the disc in both the viewing area and the illumination area. Again, mirror 1 is adjusted until the two images coincide.

The keystone adjustment is made with the disc spinning as in normal operation of the microscope so that any tilt of the disc on its shaft will have no effect on the accuracy of the adjustment. Normally the keystone adjustment is made before any other adjustment. All other adjustments can then be made and the correct keystone adjustment will not be affected.

The centering of the disc is also a critical adjustment easily accomplished by observing light patterns through the eyepiece. The previous section described a disc hub mechanism permitting centering to 1 micron accuracy. The disc centering adjustment is made by first setting up the microscope as would be done to accomplish the adjustments by Moire patterns, and turning the temporary size adjusting screw 51 clockwise to achieve a bright area as indicated in FIG. 11. The disc motor is then turned off. When the disc stops, the individual disc holes of the viewing area can be seen, making the bright area hard to discern. At this point the eyepiece can be defocused, blurring the individual disc holes until they merge, thus making the bright area easy to see again. Disc centering can be tested by rotating the disc by hand and observing the bright area. If the bright area remains stationary the disc is centered, but if the bright area moves in an orbit as the disc is rotated, the disc is not centered. The disc is centered by adjusting screws to move the bright area to the center of its orbit. If the disc is rotated so that one of the screws is opposite one of the position adjusting screws, then the two opposite screws have the same effect on the position of the bright area. Because of the possible diagonal motion illustrated in FIG. 14, it is best to adjust the disc centering after the rotation adjustment has been made. Small disc centering errors will not affect the accuracy of the other adjustments.

It is possible for the disc to be so far off center that the bright area illustrated in FIG. 10 will actually appear as a bright ring rather than a bright area. This happens if the orbit of the bright area is larger in diameter than the bright area itself. In this case it will be best to make an approximate adjustment of the disc center before the other Moire pattern adjustments are made. Nonetheless, the keystone adjustment is best made first.

3. Step-By-Step Alignment Process

In order to demonstrate the application of the invention, the following paragraphs describe a step-by-step process to achieve alignment easily and precisely. The process assumes that initial factory alignment, which is accomplished by aligning certain registration points on the disc, has been accomplished, thus assuring that the process described herein is begun with a condition of close alignment already existing, as is normally the case. The method is a follows:

1. Keystone Adjustment

Turn on the disc motor. Remove the objective lens and operate the disk with the lamp off. Look into the beamsplitter through the objective lens hole at the reflection of your eye. Adjust mirror 1 (FIG. 3) until the two reflections of the eye merge into one.

2. Rotation Adjustment a. Set the microscope up to observe a first surface mirror in the normal manner of general use of the microscope. Observe through the eyepiece and focus on the mirror while turning the size adjusting screw 44 (FIG. 5) clockwise. An area of the field of view will appear bright. Turn the size adjusting screw clockwise until the bright area decreases in size as the screw is turned clockwise. Turn the size adjusting screw until the bright area is approximately one third of the diameter of the field of view. Some refocusing of the microscope may be required as the size adjustment screw is turned.

b. Use the position adjusting screws 33 and 34 on slide pins 21 and 22 (FIG. 4) to move the bright area to the center of the field of view. Rotate one of the position adjusting screws and note the direction of the motion of the bright area. Nominally the bright area will move in the direction of action of the position adjusting screw used. If the bright area moves at an angle relative to the direction of action of the position screw used, the rotation adjusting nut 41 (FIG. 5) should be rotated a little at a time until the bright area moves in the nominal direction in response to the position adjusting screws. In general it will be necessary to use both position adjusting screws to re-center the bright area as the rotation adjustment is used.

3. Size Adjustment

Re-center the bright area and note the direction of motion of the bright area in response to the position adjusting screws 33 and 34 on slide pins 21 and 22. Rotate the size adjusting screw 44 counterclockwise and note that the bright area increases in size. Rotate the size adjusting screw counterclockwise until the bright area fills the whole field of view. Continue to rotate the size adjust counterclockwise until the whole field of view dims uniformly as one of the position adjusting screws is used to move the bright area. The dimming of one side of the field of view first implies the motion of the bright area toward the other side. If this direction of motion in response to the position adjusting screw is opposite to the direction noted, the size adjustment 44 must be rotated clockwise until the whole field of view dims uniformly in response to the position adjusting screw.

4. Position Adjustment a. Turn the second size adjusting screw 51 (FIG. 5) clockwise until the bright area is slightly smaller than the field of view. Use the position adjusting screws to re-center the bright area. Rotate the second size adjusting screw 51 counterclockwise until the tilt plate 37 (FIG. 5) rests against the first size adjusting screw 44.

b. Position may be adjusted by turning the position adjusting screws so as to achieve the maximum brightness of the field of view.

To achieve the approximate adjustment required prior to beginning this procedure, conventional industry adjustment methods can be used. Preceding the approximate adjustment by the procedure of step one will simplify the process.

5. Disc Centering Process a. Arrange the microscope to observe a first surface mirror in the normal manner of general use of the microscope. Focus on the mirror while turning the second size adjusting screw 51 (FIG. 5) clockwise until the bright area is approximately one third of the diameter of the field of view. Turn off the disk motor. Individual disc holes can now be seen, and the bright area may be hard to perceive. Defocus the eyepiece until the individual holes blur to the point of merging. In this condition the bright area will again be perceived.

b. Rotate the disk by hand. If the bright area orbits in a circle as the disk is rotated, then the disk needs to be centered. Use the disk centering screws 58 and 59 (FIG. 7) to move the bright area to the center of its orbit.

c. Return the second size adjusting screw 51 to its former position and refocus the eyepiece.

The step-by-step process described above is only one specific method for using the Moire pattern concept to adjust the microscope. For example the rotation adjustment can be made by using the rotation adjusting nut to produce the largest bright area possible without turning the size adjusting screw. In general the larger the bright area, the closer to proper alignment is the microscope. Also the brighter the center of the field of view, the closer the alignment is. These generalities can allow the adjustment of tandem scanning reflected light microscopes of entirely different design.

Many variations and modifications of the above-described embodiments are within the ordinary skill of the skilled artisan in this art, without departing from the scope of the invention. Accordingly, those modifications and embodiments are intended to fall within the scope of the invention as defined by the following claims.

I claim:

1. A tandem scanning confocal reflected light microscope, comprising
   a base member,
   a scanning disc rotatable about an axis, having a plurality of identical patterns of transparent areas,
   a plurality of elements in a light path that directs light from a light source
   (1) through an illumination region of the transparent apertures of the disc to
   (2) a beamsplitter for directing light passing through the disc to a location wherein a specimen to be analyzed is to be located, and
   (3) passing light reflected from a specimen through the beamsplitter to a viewing area on the disc,
   said viewing area having a pattern of transparent areas identical to those of the illuminated region,
   said scanning disc having planer opposed surfaces and a light reflective material for causing light impinging on said disc to be subjected to specular reflection so as to produce an image.

2. A tandem scanning confocal reflected light microscope according to claim 1 wherein
said disc is fabricated from a transparent material, and said light reflective material is a medium formed as a coating on one of said surfaces.

3. A scanning disc according to claim 2 wherein said light reflective material is located at the interface of said disc and said coating.

4. A tandem scanning confocal reflected light microscope according to claim 1 wherein said transparent areas are approximately 20 to 30 microns in diameter.

5. A tandem scanning reflected light microscope according to claim 1 further comprising
a beamsplitter constituting one of said elements in said light path,
said beamsplitter being located such that said light reflective material reflects light from and toward said beamsplitter.

6. A tandem scanning confocal reflected light microscope, comprising
a base member,
a scanning disc rotatable about an axis, having a plurality of transparent areas that are identically located on opposite sides of the disc,
a plurality of elements in a light path that directs light
(1) through an illumination region of the transparent apertures of the disc to
(2) a region wherein a specimen to be analyzed is to be located, and
(3) passing light reflected from a specimen to a viewing area on the disc,
said viewing area having a pattern of transparent areas identical to those of the illuminated region,
a tilt plate fixed to said base member,
said tilt plate having a beamsplitter and fixed mirror mounted thereon,
said tilt plate being constrained in motion in the x-direction along a line passing approximately through the line of intersection of the plane of the semi-reflective surface of the beamsplitter and the plane of the surface of the fixed mirror.

7. A tandem scanning confocal reflected light microscope, comprising
a scanning disc rotatable about an axis, and having a plurality of transparent areas that are identically located on opposite sides of the disc,
a base member for supporting said disc and a plurality of elements in a light path that directs light
(1) through an illumination region of the transparent apertures of the disc to
(2) a region wherein a specimen to be analyzed is to be located, and
(3) passing light reflected from a specimen to a viewing area on the disc,
said viewing area having a pattern of transparent areas identical to those of the illuminated region,
a main frame having a large flat surface,
a compound mounted parallel to said large flat surface and having a central axis perpendicular to said large flat surface and collinear with the axis of rotation of said scanning disc,
said compound having contact with said large flat surface to maintain the parallel relationship,
means for moving said compound parallel to said large flat surface in various directions and in rotation relative to said central axis,
said scanning disc mounted on said compound for rotation about the axis of said disc.

8. A tandem scanning confocal reflected light microscope as in claim 7, wherein
said scanning disc has a reflective medium on a surface parallel to said large flat surface.

9. A tandem scanning confocal reflected light microscope as in claims 7 or 8, wherein
said elements are independently adjustable to provide size adjustments that affect only size and position adjustments that affect only position.

10. A tandem scanning confocal reflected light microscope as in claims 7 or 8, further comprising
a tilt plate mounted on a surface of the base member parallel to said large flat surface for rotation about and translation along an axis in a plane parallel to said large flat surface,
said elements mounted on said tilt plate to control size and rotation, adjustment, and
means for adjustably rotating said tilt plate about said axis and translating said tilt plate along said axis.

11. A tandem scanning confocal reflected light microscope as in claim 10, wherein
the materials of said frame, said compound said means for moving said compound, said tilt plate and said means for adjusting all have substantially the same coefficients of thermal expansion.

12. A tandem scanning confocal reflected light microscope, comprising
a scanning disc rotatable about an axis, and having a plurality of transparent areas that are identically located on opposite sides of the disc,
a base member for supporting said disc and a plurality of elements in a light path that directs light
(1) through an illumination side of the transparent apertures of the disc to
(2) a region wherein a specimen to be analyzed is to be located, and
(3) passing light reflected from a specimen to a viewing area on the disc,
said viewing area having a pattern of transparent areas identical to those of the illuminated region,
a main frame having a large flat surface,
a compound mounted parallel to said large flat surface and having a central axis perpendicular to said large flat surface and collinear with the axis of rotation of said scanning disc,
said compound having three points of contact with said large flat surface to maintain the parallel relationship,
means for moving said compound parallel to said large flat surface in various directions and in rotation relative to said central axis,
said scanning disc mounted on said compound for rotation about the axis of said disc.

* * * * *